(12) United States Patent
Qiao et al.

(10) Patent No.: US 12,411,994 B2
(45) Date of Patent: Sep. 9, 2025

(54) FINGERPRINT BASED GRAPH ADVERSARIAL DEFENSE

(71) Applicant: International Business Machines Corporation, Armonk, NY (US)

(72) Inventors: Mu Qiao, Belmont, CA (US); Wenqi Wei, Campbell, CA (US); Divyesh Jadav, San Jose, CA (US); Roger C. Raphael, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 18/215,236

(22) Filed: Jun. 28, 2023

(65) Prior Publication Data
US 2025/0005201 A1    Jan. 2, 2025

(51) Int. Cl.
*G06F 21/00*    (2013.01)
*G06F 21/32*    (2013.01)
(Continued)

(52) U.S. Cl.
CPC .............. *G06F 21/64* (2013.01); *G06F 21/32* (2013.01); *G06F 21/44* (2013.01); *G06F 21/55* (2013.01); *G06F 2221/033* (2013.01)

(58) Field of Classification Search
None
See application file for complete search history.

(56) References Cited

U.S. PATENT DOCUMENTS

| 11,341,394 B2 | 5/2022 | Ludwig et al. |
| 11,443,069 B2 | 9/2022 | Liu et al. |

(Continued)

FOREIGN PATENT DOCUMENTS

| CN | 113378160 A | 9/2021 |
| CN | 114708479 A | 7/2022 |

(Continued)

OTHER PUBLICATIONS

Eppstein, David et al., "Models and Algorithms for Graph Watermarking", arXiv:1605.09425v1 [cs.MM] May 30, 2016, 26 pages.

(Continued)

*Primary Examiner* — Andrew J Steinle
(74) *Attorney, Agent, or Firm* — CANTOR COLBURN LLP; Anthony Mauricio Pallone

(57) ABSTRACT

Mechanisms are provided for detecting adversarial attacks on graph data structures. A first graph fingerprint engine generates, for a first graph data structure, a first fingerprint data structure-based on features extracted from the first graph data structure. A second graph data structure is received, and a second graph fingerprint engine generates a second graph fingerprint data structure based on features extracted from the second graph data structure. An adversarial attack detection engine compares the first fingerprint data structure to the second fingerprint data structure to determine whether the first fingerprint data structure matches the second fingerprint data structure. In response to the first fingerprint data structure not matching the second fingerprint data structure, the adversarial attack detection engine outputs an output indicating that the second data structure corresponds to an adversarial attack.

17 Claims, 9 Drawing Sheets

(51) Int. Cl.
*G06F 21/44* (2013.01)
*G06F 21/55* (2013.01)
*G06F 21/64* (2013.01)

(56) References Cited

U.S. PATENT DOCUMENTS

| | | |
|---|---|---|
| 2020/0247433 A1 | 8/2020 | Scharfenberger et al. |
| 2021/0211291 A1 | 7/2021 | Jindal et al. |
| 2022/0156563 A1 | 5/2022 | Zhang et al. |
| 2023/0385815 A1* | 11/2023 | Jakobsson .............. G06Q 20/36 |
| 2024/0370935 A1* | 11/2024 | Gilbertson ............. G06Q 40/08 |

FOREIGN PATENT DOCUMENTS

| | | | |
|---|---|---|---|
| WO | WO2021/051561 A | 3/2021 | |
| WO | WO-2022229731 A1 * | 11/2022 | ............. G06F 21/54 |

OTHER PUBLICATIONS

Zhao, Xiaohan et al., "Towards Graph Watermarks", COSN '15: Proceedings of the 2015 ACM on Conference on Online Social Networks Nov. 2015, 12 Pages.

Zhao, Xiangyu et al., "Watermarking graph neural networks by random graphs", arXiv:2011.00512v2 [cs.CR] Apr. 1, 2021, 6 pages.

\* cited by examiner

FINGERPRINT BASED GRAPH ADVERSARIAL DEFENSE

BACKGROUND

The present application relates generally to an improved data processing apparatus and method and more specifically to an improved computing tool and improved computing tool operations/functionality for defense against adversarial attacks on graph data structures based on graph fingerprinting.

Many systems may be modeled using graph data structures. For example, networks of computing devices, social networks using connections between users, chemical structures, knowledge graph data structures representing concepts and their interconnectedness, ontology data structures, interactions between entities, bioinformatics, pharmaceuticals and the like, may all be modeled using graph data structures. Essentially, any system in which elements are connected with each other through relationships or interactions may be modeled as a graph data structure having nodes representing the elements or entities, and edges representing the relationships or interactions between those elements or entities.

Graph neural networks (GNNs) are a type of deep learning computer model that may operate on graph data structures to generate predictions and/or classifications. The GNN operates on a graph embedding that captures the nodes and edges of the graph as well as other information, such as global context information, and utilizes neural networks to process this graph embedding to generate predictions and/or classifications. Different types of GNNs exist including graph convolutional networks, graph auto-encoder networks, recurrent graph neural networks, and gated graph neural networks, for example. The types of GNN tasks that may be performed include graph classification, node classification, link prediction, community detection, graph embedding, and graph generation.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for detecting adversarial attacks on graph data structures. The method comprises generating, by a first graph fingerprint engine, for a first graph data structure, a first fingerprint data structure based on features extracted from the first graph data structure. The method further comprises receiving a second graph data structure and generating, by a second graph fingerprint engine, a second graph fingerprint data structure-based on features extracted from the second graph data structure. Moreover, the method comprises comparing, by an adversarial attack detection engine, the first fingerprint data structure to the second fingerprint data structure to determine whether the first fingerprint data structure matches the second fingerprint data structure. In addition, the method comprises in response to the first fingerprint data structure not matching the second fingerprint data structure, outputting, by the adversarial attack detection engine, an output indicating that the second data structure corresponds to an adversarial attack.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
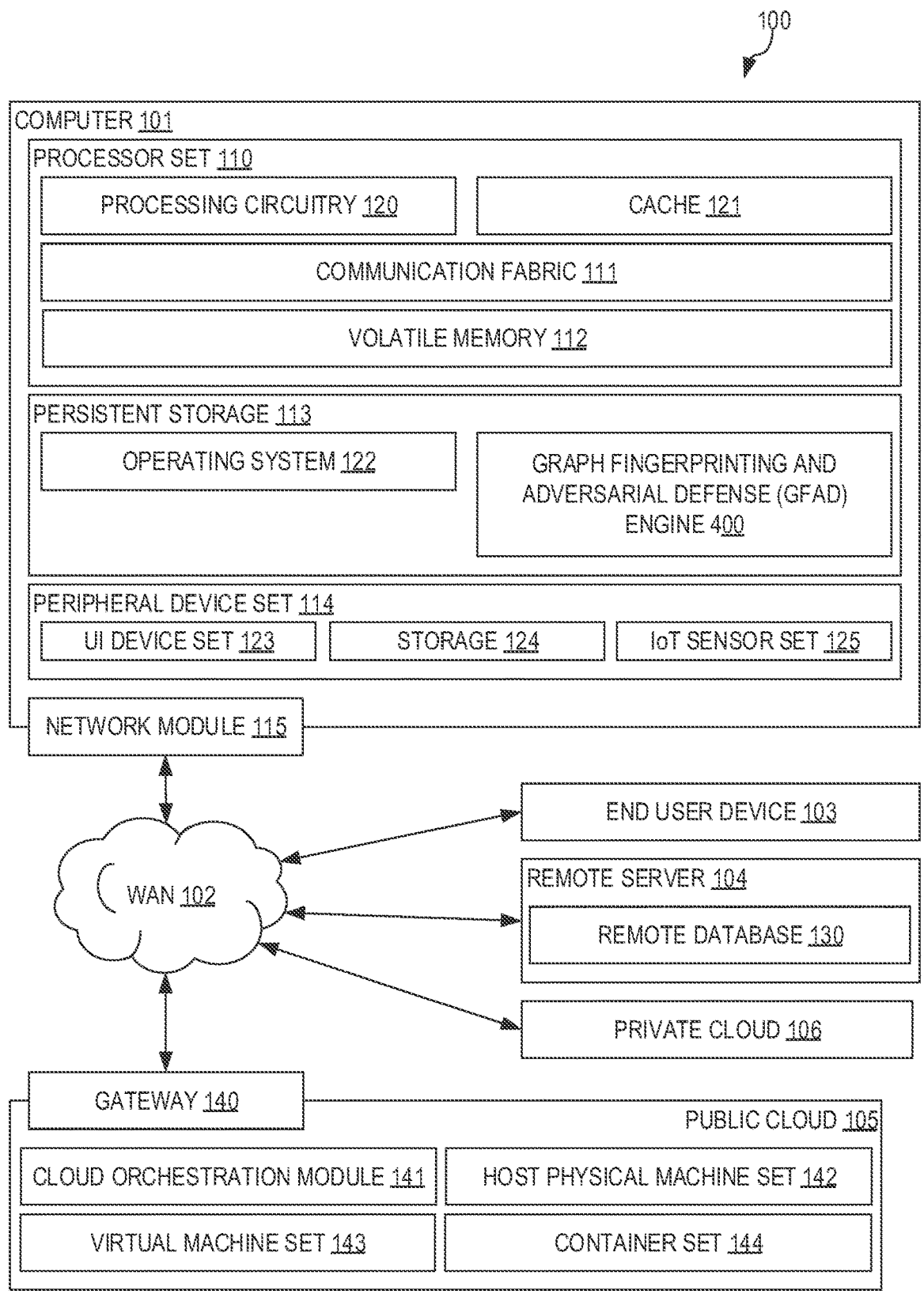
FIG. 1 is an example diagram of a distributed data processing system environment in which aspects of the illustrative embodiments may be implemented and at least some of the computer code involved in performing the inventive methods may be executed.

While artificial intelligence (AI) computer models have been developed to operate on datasets that can be represented as graphs and thus, leverage the knowledge of the entities and relationships or interactions between entities to make predictions, classifications, and the like, it has been realized that these AI computer models may be the victims of adversarial attacks. For example, with a graph neural network (GNN) based AI computer model, it has been determined that an adversary may modify the graph data structure through perturbations to cause the GNN to generate predictions/classifications that are incorrect.

An adversarial attacker may interject small changes into the graph data structure, such as adding an edge between nodes, adding a node and edge, removing one or more edges, removing one or more nodes, or making other modifications to the graph data structure, which may cause the GNN to make incorrect predictions and/or classifications. These perturbations may not be readily perceivable to the outside viewer, especially when the graph data structures are large, e.g., consider a social networking system having thousands of users that is modeled as a graph data structure, and in which adding a node or edge will be practically imperceivable yet may cause a significant enough change to affect predictions or classifications if made in right place and manner. This may be done in the graph data structures that are used to train the GNNs to cause the GNNs to be trained incorrectly, and may be done during a runtime or production phase (also referred to as an inference phase) operation on new graph data structures being processed by the already trained GNNs.

Such adversarial attacks may have significant consequences depending on the task to which the AI computer model is applied. For example, in cases where the AI computer model is recommending associations between users of a social networking system, the consequences may not be that severe, but are still problematic in that the AI computer model may recommend associations that are incorrect due to tampering with the social network's graph data structure. However, in cases where the AI computer model is involved in supporting decision making for automated vehicle controls, patient medical treatments, detecting security vulnerabilities in computing systems, or other AI computer tasks that may involve graph data structure processing, such as via GNNs or the like, the results of an incorrect prediction/classification can be catastrophic.

Thus, it is important to protect AI computer models, e.g., GNNs or the like, which operate on graph data structures from such adversarial attacks. The illustrative embodiments provide an improved computing tool and improved computing tool functionality/operations that defend against adversarial examples (e.g., adversarial examples of adding/dropping edges, changing node attributes, or the like) on graph data structures, where the improved computing tool and improved computing tool functionality/operations leverage graph fingerprinting, from both a structure and learning based perspective, as a security mechanism. With structure-based fingerprinting, the illustrative embodiments identify a set of structure features, e.g., node degrees or statistical distribution) and encodes these features with an encoding mechanism, such as hashing. For a given graph data structure at a runtime or inference phase, the structure features are extracted from the graph data structure and the encoding of those extracted features are generated and compared to the stored encoding for the graph that was previously generated, e.g., the stored hash and the inference phase hash are compared. If the encoding match, then the graph data structure has not been tampered with. Otherwise, if there is not a match, the inference phase graph data structure may be considered to have been tampered with. In some cases, a salt (or inserted modification of the data) may be added to the extracted features to generate a level of randomness to the fingerprint for more secure encoding, with this salt being stored in association with the fingerprint so that it may be used thereafter for fingerprint validation.

For learning-based fingerprinting, a subset of nodes of the graph data structure are identified as the fingerprint nodes for the graph data structure (hereafter simply referred to as the "graph" for ease of explanation). Multiple fingerprint GNNs (also referred to as GNN-FPs) are trained on the fingerprint nodes and the learning performance of the GNN-FPs are compared to determine whether there has been a tampering with a graph data structure. That is, if the learning performance, e.g., accuracy, of the trained GNN-FPs on the fingerprint nodes in a current graph matches the learning performance on the fingerprint nodes in the original graph, then the graph has not been tampered with. Otherwise, it can be determined that the graph has been compromised.

Having identified the graph data structure as compromised or uncompromised by the structure-based fingerprinting and learning-based fingerprinting mechanisms of the illustrative embodiments, an output notification may be provided to appropriate personnel or downstream computing system processes to inform them of the reliability or unreliability of the graph data structure and the results generated by the AI computer model operating on the graph data structure. In some illustrative embodiments, processing of the graph data structure by the AI computer model may be discontinued or the results of such processing discarded as unreliable due to the graph data structure having been compromised. For example, during a training operation for training the AI computer model, e.g., the GNN, if the graph data structure is determined to have been compromised, then the graph data structure may not be used to train the AI computer model. During inference phase, the provider of the graph data structure may be informed that the graph data structure is believed to have been compromised and unreliable, and given an opportunity to discontinue processing or continue processing in view of the potential unreliability of the graph data structure.

By being able to evaluate graph data structures to determine if they have been compromised, the reliance on the results generated by graph based AI computer models, such as GNNs, which are increasingly being utilized to provide predictions and classifications, may be better assured. That is, with security mechanisms such as that of the illustrative embodiments, computing systems and personnel that choose to rely on these AI computer models to assist them in performing decision making, or performing other operations based on the predictions and classifications generated by the AI computer models, may be given a greater level of trust for the AI computer models and their operation, as they know that the input graph data structures are being evaluated for potential compromise. This leads to greater trust and reliability of the results generated and the results of other downstream computer processes.

Thus, in some illustrative embodiments, a method, computer program product, and/or apparatus, data processing system, or the like is provided for detecting adversarial attacks on graph data structures. The process, in accordance with some illustrative embodiments, comprises generating, by a first graph fingerprint engine, for a first graph data structure, a first fingerprint data structure-based on features extracted from the first graph data structure. The process further comprises receiving a second graph data structure and generating, by a second graph fingerprint engine, a second graph fingerprint data structure-based on features extracted from the second graph data structure. Moreover, the process comprises comparing, by an adversarial attack detection engine, the first fingerprint data structure to the second fingerprint data structure to determine whether the first fingerprint data structure matches the second fingerprint data structure. In addition, the process comprises in response to the first fingerprint data structure not matching the second fingerprint data structure, outputting, by the adversarial attack detection engine, an output indicating that the second data structure corresponds to an adversarial attack.

In some illustrative embodiments, the second graph data structure is the same graph data structure as the first graph data structure in response to the second graph data structure not having perturbation differences from the first graph data structure, and the second graph data structure is different from the first graph data structure in response to adversarial perturbations being introduced into the first graph data structure. In some illustrative embodiments, the first fingerprint engine executes on a first graph data structure owner computing system, and the second fingerprint engine executes on a remote computing system from the first graph data structure owner computing system.

In some illustrative embodiments, generating the first fingerprint data structure comprises extracting first structure features of nodes and edges of the first graph data structure, and inputting the extracted first structure features into a hashing function to generate the first fingerprint data structure which comprises a first hash value corresponding to the first extracted structure features. In still some illustrative embodiments, generating the second fingerprint data structure comprises extracting second structure features of nodes and edges of the second graph data structure, and inputting the extracted second structure features into the hashing function to generate the second fingerprint data structure which comprises a second hash value corresponding to the extracted second structure features. In some illustrative embodiments, comparing the first fingerprint data structure and second fingerprint data structure comprises comparing the first hash value to the second hash value to determine whether the first hash value matches the second hash value.

In some illustrative embodiments, a graph neural network (GNN) model is trained, using a machine learning training operation, based on input features of graph data structures, to generate fingerprints of the graph data structures. In some illustrative embodiments, generating the first fingerprint data structure comprises extracting first features of nodes of the first graph data structure, and inputting the extracted first structure features into the trained GNN to generate the first fingerprint data structure which comprises performance information of the trained GNN for the generation of the first fingerprint data structure. In still some illustrative embodiments, generating the second fingerprint data structure comprises extracting second features of nodes of the second graph data structure, and inputting the extracted second structure features into the trained GNN to generate the second fingerprint data structure which comprises performance information of the trained GNN for the generation of the second fingerprint data structure. In some illustrative embodiments, comparing the first fingerprint data structure and second fingerprint data structure comprises comparing the first performance information with the second performance information to determine whether the first performance information matches the second performance information.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides a graph fingerprinting and adversarial devices (GFAD) engine. The improved computing tool implements mechanisms and functionality, such as graph fingerprinting based on graph structure and learning performance attributes of a graph based AI computer model, and logic for evaluating whether a graph data structure has been compromised based on these fingerprints, which cannot be practically performed by human beings either outside of, or with the assistance of, a technical environment, such as a mental process or the like. The improved computing tool provides a practical application of the methodology at least in that the improved computing tool is able to determine whether a graph data structure has been compromised or not so as to determine whether to processing the graph data structure via a graph based AI computer model, or otherwise rely upon the graph data structure for downstream computer system processing.

FIG. 1 is an example diagram of a distributed data processing system environment in which aspects of the illustrative embodiments may be implemented and at least some of the computer code involved in performing the inventive methods may be executed. That is, computing environment 100 contains an example of an environment for the execution of at least some of the computer code involved in performing the inventive methods, such as Graph Fingerprinting and Adversarial Defense (GFAD) engine 400. In addition to GFAD engine 400, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and GFAD engine 400, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in GFAD engine 400 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block GFAD engine 400 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As shown in FIG. 1, one or more of the computing devices, e.g., computer 101 or remote server 104, may be specifically configured to implement a Graph Fingerprinting and Adversarial Defense (GFAD) engine 400. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computing device 101 or remote server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates detecting adversarial attacks on graph based AI computer models by introducing perturbations into input or training graph data structures, where this detection is based on automatically generated graph structure and machine learning performance characteristic based fingerprints of original graphs compared to inference phase received graphs.

As noted previously, graph based computer models are fast becoming a basis for many types of prediction and classification operations performed in computing systems, and especially artificial intelligence (AI) computer systems that operate on networks of entities, their relationships, and interactions. While these AI computer systems and the graph based computer models they employ, provide a powerful tool in performing predictions and classifications, they are susceptible to adversarial attacks. To illustrate this further, consider the examples shown in FIGS. 2 and 3.

Figure 2:
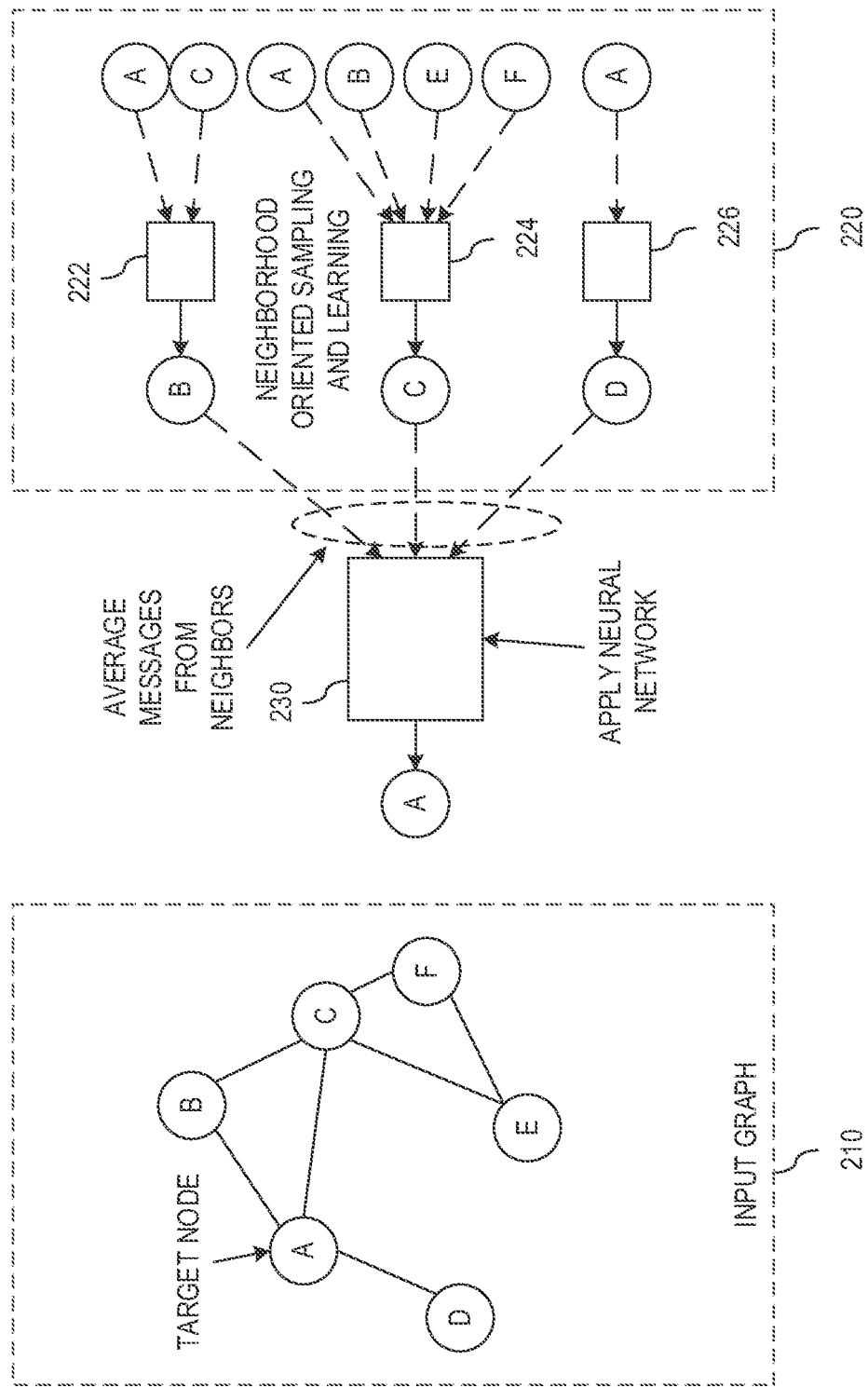
FIG. 2 is an example diagram illustrating one example methodology employed by a graph based computer model to infer a characteristic or classification of a node in a graph data structure.

FIG. 2 is an example diagram illustrating one example methodology employed by a graph based computer model to infer a characteristic or classification of a node in a graph data structure. This is also referred to as a node classification task, and as noted above, graph based computer models, such as GNNs, may be employed to perform such node classification tasks.

As shown in FIG. 2, an input graph 210 has a plurality of nodes A-F that have edges connecting these nodes based on determined relationships and/or interactions between the entities modeled by the nodes A-F. In this case, assume that the relationships are based on the entities messaging one another, such as in a social networking computer system or the like. Also, assume that a task requires the determination of a classification of a target node A in this input graph 210. One option for learning the features of a target node, and thereby classifying the target node, is to evaluate the features/classifications of the nearest neighbors of that target node, e.g., learning the value of the features/classification for target node A by evaluating similar features/classifications of the closest neighboring nodes B, C, and D. This may be done at many levels of the hierarchy of the graph data structure 210. For example, as shown in element 220, the nearest neighbor nodes of node B, i.e., nodes A and C, may be used by a neural network 222 to determine features of node B, the nearest neighbors of node C may be used by the neural network 224 to determine the features of node C, and the nearest nodes of node D, i.e., node A, may be used by a neural network 226 to determine the features of node D, such as through a distance based inheritance mechanism. For example, features of node A can be determined based on features of its connected nodes, or even connected subgraphs to node A, within a specified distance limit depending on the domain that is using and building the graph data structure. In one example, for node A, the neural network 230 is applied to the features of the nearest neighbor nodes B, C, and D to generate the features of node A, e.g., averaging the similar features from nodes B, C, and D to generate the features for node A, or any other aggregation or function applied to the features of nodes B, C, and D.

From FIG. 2 it is clear that this evaluation of node A is highly dependent on the nodes and edges connected to node A, or even subgraphs connected to node A, as well as the nodes and edges connected to those nodes or subgraphs. If one were to modify the graph data structure 210, e.g., by adding or removing nodes and/or edges, it may affect the evaluation of the features/classification of node A. Thus, an adversary may perform an attack on computer models that operate based on the graph data structure 210 by making modifications to the graph data structure 210 that will affect the way in which the computer model operates, or the results generated by the computer model.

Figure 3:
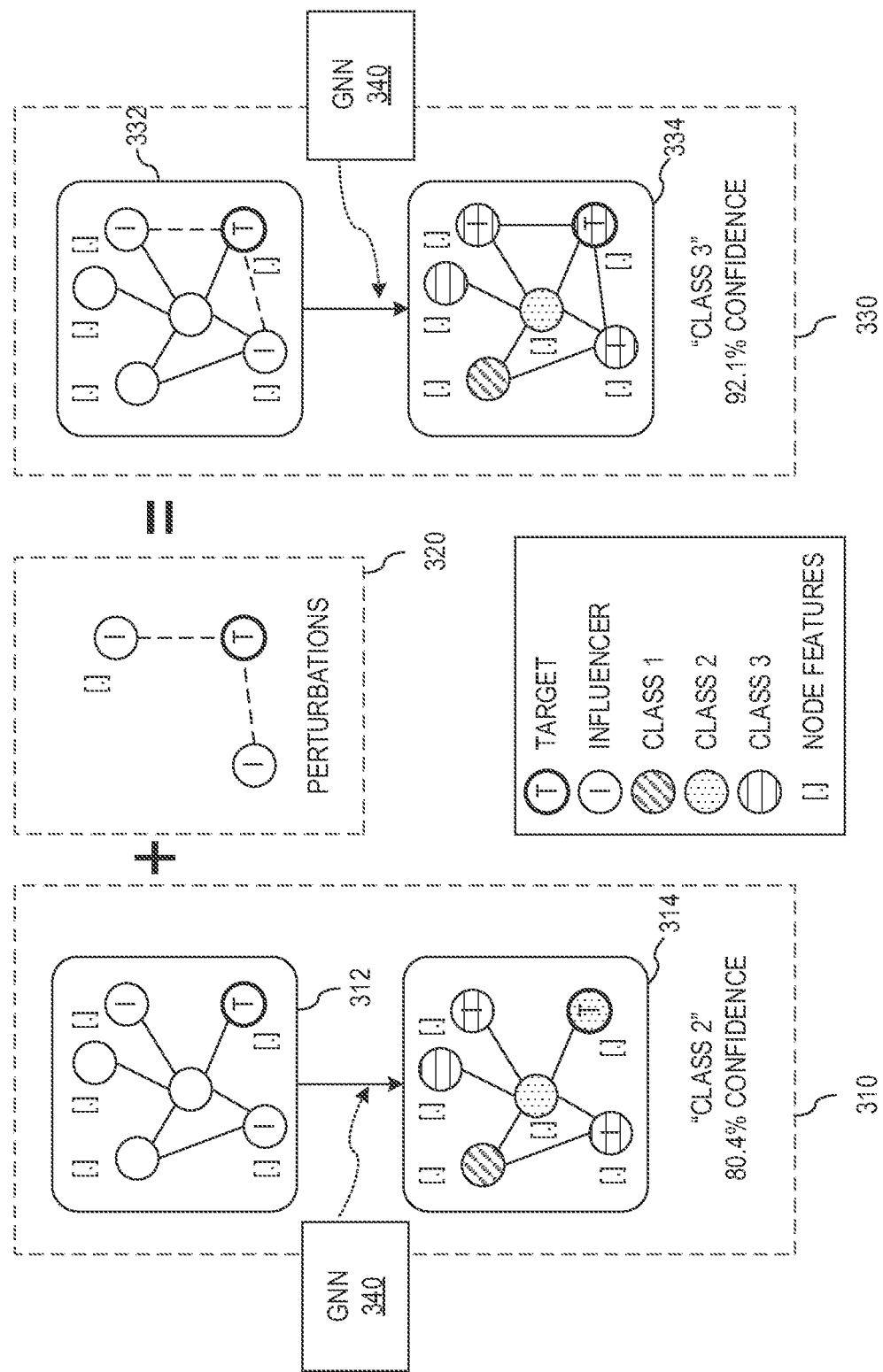
FIG. 3 is an example diagram illustrating the way in which a perturbation to a graph data structure may affect a classification made based on the graph data structure.

FIG. 3 is an example diagram illustrating the way in which a perturbation to a graph data structure may affect a classification made based on a graph data structure. As shown in FIG. 3, in a first instance 310 that assumes an original graph data structure 312 having target node T and influencer nodes I, if this original graph data structure 312 is input to a graph neural network (GNN) 340, the GNN 340 will generate the prediction 314 of classifications shown, where certain nodes are classified as class 1, class 2, and class 3. In this example, assume that the influencer nodes have class 3 classifications, but that their influence on the target node T via the intermediate node, causes the intermediate node to have more influence on the target node T. Thus, a classification for the target node T of "class 2" with an 80.4% confidence is generated, which is due to the more influential intermediate node to which the influencer nodes I connect to the target node T.

Now, assume that a perturbation 320 is introduced into the original graph 312 to generate a modified graph data structure 332 in a second instance 330. The modified graph data structure 332 now includes connections directly from the influencer nodes I to the target node T, which were not present in the original graph data structure 312. As a result, the influencer nodes I in the modified graph data structure 332 will have greater influence on the classification of class T than they have in the original graph data structure 312. Thus, when processed by the same GNN 340, the modified graph data structure will cause the GNN 340 to generate the prediction 334 in which the target node T will have a classification of class 3 with a 92.1% confidence, as there is a greater influence from the direct connections between influencer nodes I. This results in an incorrect classification of the target node T, i.e., class 3 rather than the correct classification of class 2, even though the incorrect classification has a greater confidence.

The illustrative embodiments provide an improved computing tool and improved computing tool functionality/operations to detect when such adversarial attacks may be present in an input graph data structure that is to be processed by a graph based computer model, which will be assumed for this description to be a graph neural network (GNN). The illustrative embodiments provide an improved graph fingerprinting mechanism that operates as a security mechanism for ensuring that input graph data structures have not been compromised by adversarial attacks, such as the introduction of perturbations as illustrated in FIG. 3, for example. The illustrative embodiments may operate to notify graph data structure providers, AI computer system administrators, or other authorized personnel of the detection of an adversarial attack based on the graph fingerprinting mechanisms, as well as perform automated operations to discontinue processing of a compromised graph data structure, invalidating predictions/classifications made based on a compromised graph data structure, or the like.

Figure 4:
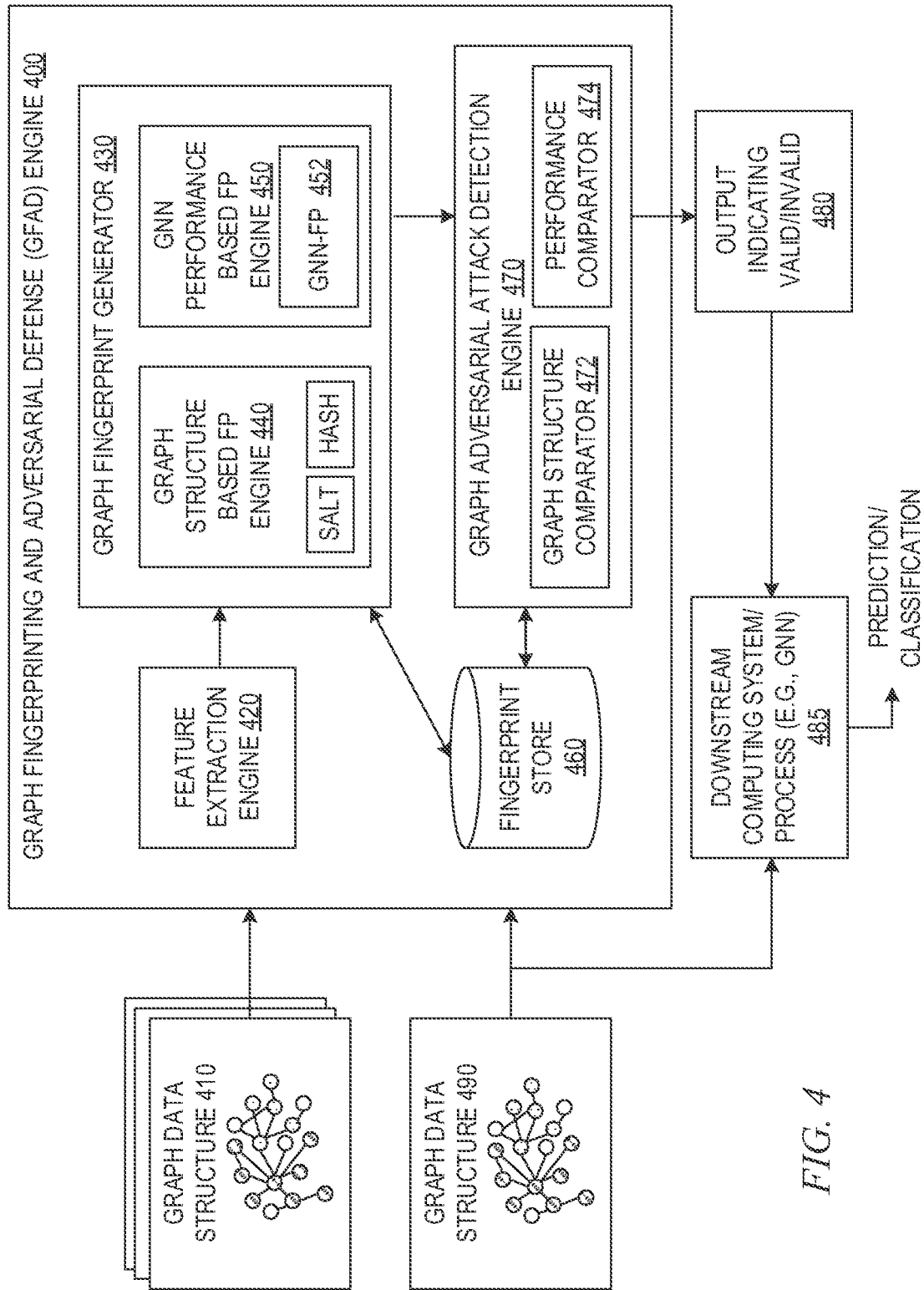
FIG. 4 is an example block diagram illustrating the primary operational components of a Graph Fingerprinting and Adversarial Defense (GFAD) engine 400 in accordance with one illustrative embodiment.

FIG. 4 is an example block diagram illustrating the primary operational components of a Graph Fingerprinting and Adversarial Defense (GFAD) engine 400 in accordance with one illustrative embodiment. The operational components shown in FIG. 4 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings, e.g., search queries, and the resulting output may aid human beings. The illustrative embodiments are specifically directed to the automatically operating computer components directed to improving the security of graph based computer models and AI computing systems, and providing a specific solution that implements graph fingerprinting based on structural and computer model performance characteristics, which cannot be practically performed by human beings as a mental process and is not directed to organizing any human activity.

As shown in FIG. 4, the GFAD engine 400 comprises a feature extraction engine 420, a graph fingerprint generator 430, a graph adversarial attack detection engine 470, and a fingerprint store 460. The graph fingerprint generator 430 further includes a graph structure-based fingerprint (FP) engine 440 and a GNN performance-based FP engine 450. The graph adversarial attack detection engine 470 comprises a graph structure comparator 472 and a performance comparator 474 which operate to detect changes in graph structure and/or GNN performance, respectively, to determine if a graph data structure has been potentially compromised. The GFAD engine 400 receives as input a graph data structure 410 and outputs an indication as to whether the input graph data structure 410 is a valid, i.e., not compromised, graph data structure or an invalid, i.e., compromised, graph data structure. The operation of the various elements of the GFAD engine 400 to process the input graph data structure and generate this output of valid/invalid or not compromised/compromised, will not be described in greater detail.

During an initial stage of operation, or offline stage of operation, a baseline set of fingerprints are generated for graph data structures, where these fingerprints include, for each graph data structure, a graph structure-based fingerprint and a learning performance fingerprint for a GNN processing the graph data structure. During this offline stage of operation, the feature extraction engine 420 extracts features from the input graph data structure 410. The features extracted may take many different forms depending on the desired implementation. In some illustrative embodiments, the feature extraction engine extracts features representative of the structure of the graph data structure 410 including, but not limited to, a degree of a test node and its k-hop neighbor, shortest distance between two nodes, size of the strongly connected components, Motif histogram, and the like The test nodes are nodes from the original graph data structure 410 chosen based on node and/or edge attributes in accordance with criteria of the particular implementation or domain of the graph data structures, e.g., most influential or socially important (in a social network graph data structure), nodes having a number of edges above a particular threshold, etc.

The graph fingerprint generator 430 generates the fingerprint data structures and stores these fingerprint data structures in the fingerprint store 460 in association with an identifier, metadata, or other link to the original graph data structure that was the basis of the fingerprint data structures. Thus, the fingerprint store 460 stores a set of fingerprint data structures for each graph data structure 410 that is input to the GFAD engine 400, and these fingerprint data structures represent the baseline fingerprint data structures for an unmodified, or uncompromised graph data structure 410. The stored fingerprint data structures may then be used later during runtime or inference phase operations to detect potential compromise of the graph data structure.

Thus, during the offline stage of operation, the baseline structural and performance-based fingerprints for the original graph data structure 410 are generated and stored. During an online stage of operation, a new graph data structure 490 is input to the GFAD engine 400 and a similar feature extraction is performed by the feature extraction engine 420 followed by fingerprint generation by the graph fingerprint generator 430 on the features extracted from the new graph data structure 490 and based on the performance of the GNN in processing the new graph data structure 490. It should be appreciated that the new graph data structure 490 may be the same as a graph data structure 410 previously processed to generate fingerprint data structures, or may be a different graph data structure 490 that may be a version of the original graph data structure 410 but with a perturbation having been introduced, such as due to an adversarial attack on the GNN or AI computing system that employs the GNN.

The graph adversarial attack detection engine 470 compares the generated structural and/or performance-based fingerprints for the new graph data structure 490 to the stored fingerprint data structures from the fingerprint store 460, associated with the graph data structure 410 that the new graph data structure 490 purports to be. That is, the new graph data structure 490 may be provided with a request or other indicator, such as in metadata, specifying an identity of the new graph data structure 490. This may purport to be one of the previously processed graph data structures 410, for example, but the new graph data structure 490 may be a perturbed version of the previously processed graph data structure 410 and thus, not identical to the previously processed graph data structure 410, e.g., nodes/edges may be added/removed as part of an adversarial attack.

The graph adversarial attack detection engine 470 may comprise graph structure comparator 472 that operates to compare the encoding of the structural features of the new graph data structure 490 to the stored fingerprint (and thus, structural encoding) of the purported graph data structure 410 to determine if there have been structural changes to the graph data structure 410 to generate new graph data structure 490. The graph adversarial attack detection engine 470 may further comprise a performance comparator 474 that operates to evaluate a number of matching (or correct) inferences generated by the GNN based on the new graph data structure 490, i.e., inferences, based on the same inputs to the GNN but using the new graph data structure 490, as were previously generated when using the graph data structure 410. The performance comparator 474 may further evaluate the number of non-matching (or incorrect) inferences generated by the GNN based on the new graph data structure 490. A ratio of matching and non-matching inferences may be evaluated and compared to a predetermined threshold to detect whether the performance of the GNN based on the new graph data structure 490 has been significantly altered and thus, the graph data structure 490 may be compromised.

Thus, if the compared fingerprint data structures from the fingerprint store 460 and that generated from the new graph data structure 490 sufficiently match, i.e., there has not been a structural change to the graph data structure and the performance of the GNN is not substantially altered, then the new graph data structure 490 may be determined to be valid, i.e., not compromised by an adversarial attack. If one or more of the fingerprint data structures from the fingerprint store 460 do not match the fingerprints of the new graph data structure 490, then the new graph data structure 490 may be determined to have been potentially compromised and thus, invalid. An appropriate output 480 may be output by the GFAD engine 400 indicating whether or not the new graph data structure 490 is valid or invalid. This output may be used by further downstream computing systems, computing system processes, or even authorized users to determine whether to further process the new graph data structure 490 or otherwise rely on the new graph data structure 490 for performing predictions/classifications. For example, based on whether or not the input graph data structure 490 is considered valid or invalid, the input graph data structure 490 may be forwarded to a downstream GNN 485 (e.g., when the graph data structure 490 is determined to be valid) for performing its intended task, e.g., a prediction and/or classification task, or results of the GNN 485 processing of the graph data structure 490 may be validated/invalidated.

As shown in FIG. 4, the graph fingerprint generator 430 comprises a graph structure-based fingerprint engine 440 and a GNN performance-based fingerprint engine 450. In generating the graph structure-based fingerprint by the engine 440, the graph data structure 410/490 may be processed to generate one or more vector representations of the graph data structure 410/490, such that each vector representation comprises a sequence of node features in an order corresponding to the dependency in the graph data structure 410/490. That is, the node identifiers in the graph data structure 410/490 are maintained and the ordering of the features, e.g., classes of the nodes, may be kept in order in the vector representation so as to correlate the features with the particular nodes.

A delta encoding may be applied to the vectors of the input data to thereby introduce salt or random noise into the values of the vectors. This salting is a process to avoid an adversarial attacker being able to deduce the feature vectors that may be the basis of an encoding performed by the graph structure-based fingerprint engine 440, e.g., salting the values prior to executing a hashing operation to generate a hash value of the vector input. The encoding algorithm may then be applied to generate an encoded value or vector of values as part of the graph structure-based fingerprint for the input graph data structure 410/490. In addition, other features of the graph structure may be used as part of the structure-based fingerprint, including node degree vectors or the like. These features may be combined with the other features of the graph structure, or may be separate vectors that are separately subjected to salting and encoding. As an example, a set of vector representations of various graph structure features, such as classes of nodes, degrees by class, and the like, may be combined and hashed by a hashing function to generate a hash value for the graph data structure 410/490. This hash value may then serve as the graph structure-based fingerprint for the graph data structure 410/490. Of course, other encodings of structural features of the graph data structure 410/490 may also be utilized without departing from the spirit and scope of the present invention.

When performing the online verification of the integrity of an input graph data structure 490, the graph structure-based fingerprint that was previously stored may be compared to the currently generated graph structure-based fingerprint by the graph adversarial attack detection engine 470, where the graph structure comparator 472 comprises logic for comparing encodings of the graph structural features and the performance comparator 474 comprises logic for comparing the performance of the GNN based on the different graph data structures 410/490, e.g., ratio of matching and non-matching inference results as compared to a predetermined threshold that indicates whether the graph data structure has been potentially compromised. This ratio may be considered a measure of potential compromise of the GNN based on the new graph data structure 490 compared to the original graph data structure. That is, if the ratio is matched to unmatched, if the value is high, then the accuracy is greater and, assuming the ratio is equal to or greater than a given threshold, the new graph data structure 490 is not determined to be compromised. If the ratio is low, then the accuracy is lower and, assuming the ratio is less than the given threshold, the new graph data structure 490 may be determined to be potentially compromised.

Thus, the logic of the graph structure comparator 472 may involve, for example, comparing hash values (or other encodings) of the graph structure features. Assuming that hash values are used, if the hash values differ, then it is determined that the graph data structure may have been compromised and thus, is invalid. In this process, a similar delta encoding as was previously used would be applied to the extracted structural features from the input graph data structure 490 and a similar hashing function would be applied to generate the hash value of the input graph data structure 490 for the comparison. This delta encoding may be performed by the graph structure based fingerprint engine 440 and provided to the graph adversarial attack detection engine 470 and provided to the graph structure comparator 472, or may be performed by the graph structure comparator 472 itself, depending on the desired implementation. Thus, in some illustrative embodiments, the graph structure comparator 472 may operate as a delta encoder and fast detector for quickly detecting potential compromise based on alterations to the graph structure itself as indicated by differences in the encodings.

With regard to the GNN performance-based fingerprint engine 450 operation, a test node is selected from the input graph data structure 410/490 and the nodes that are directly linked to the test node are selected as a subset of the nodes of the graph which will be used for a GNN performance-based fingerprint of the graph data structure 410/490. It should be appreciated that this is just one example of selecting a subset of nodes from the graph data structure 410/490 that may be used to generate the performance-based fingerprint and other selection algorithms may be utilized without departing from the spirit and scope of the present invention. It is important that the selection criteria be imperceptible to adversarial attackers and thus, the algorithm used to select a test node and its related nodes for the subset of nodes is not perceivable outside the GNN performance-based fingerprint engine 450. In addition, the selection criteria and/or the test node selected, may be modified over time, such as at periodic or random intervals such that the adversarial attacker may not know when the test node or selection criteria have changed.

While the graph data structure 410/490 may be forwarded to the GNN 485 for performing its intended task, e.g., generating a prediction and/or classification, the selected subset of nodes, i.e., the fingerprint nodes, may be separately processed by a GNN-FP computer model 452 which is trained for generating a fingerprint based on the fingerprint nodes. For example, the fingerprint may be the classifications for the various fingerprint nodes to thereby generate a set of classifications, or a classification vector in node order. That is, the GNN-FP computer model 452 is a classifier that classifies each of the node's input to the GNN-FP, which in the case of the example, is a set of fingerprint nodes selected as mentioned above. The classifications have associated confidence scores or accuracies that indicate how confident the GNN-FP computer model 452 is that the corresponding classification is correct. Thus, the fingerprint data structure generated by the GNN performance based fingerprint engine 450 comprises the classifications as well as performance information of the GNN-FP computer model 452, which in this example is the confidence or accuracy of the classification prediction for each fingerprint node, but could include other types of performance information. This fingerprint data structure may be stored in the fingerprint store 460 in association with an identifier of the graph data structure 410 for later use in verifying the integrity of later input graph data structures 490 purporting to be the graph data structure 410.

During the online phase of operation, a similar operation of the GNN performance based fingerprint engine 450 is performed, but on a new input graph data structure 490. That is, during the online or inference phase of operation, the graph adversarial attack detection engine 470 first executes the graph structure comparator 472, as discussed above, on the new graph data structure 490 to determine whether there is a detected structural change to the graph data structure 490 when compared to the original graph data structure 410. If this check is passed, i.e., there is no detected structural change, the operation continues to the performance comparator. In performing the structural change evaluation by the comparator 472, the test nodes used to generate the original fingerprint of the graph data structure 410 are stored in the fingerprint store 460 along with the fingerprint and can then be retrieved and used to generate the new fingerprint data structure for the new graph data structure 490 to check for structural changes. The same set of test nodes may also be used for performance comparisons as well by the performance comparator 474.

Thus, during online phase operation, similar test node(s) and corresponding linked nodes may be selected as fingerprint nodes and the corresponding fingerprint of these fingerprint nodes is generated by the GNN-FP computer model 452, where this fingerprint again includes the classifications of the fingerprint nodes and the corresponding performance information, e.g., accuracy or confidence in the classification. The fingerprint generated by the GNN-FP computer model 452 for the new input graph data structure 490 may be provided to the performance comparator 474 of the graph adversarial attack detection engine 470 to compare the performance of the GNN based on the new input graph data structure 490 to the corresponding stored fingerprint data structure retrieved from the fingerprint store 460 for the graph data structure, e.g., 410, that the input graph data structure 490 purports to be. In comparing the fingerprint data structures, not only are the classifications for the fingerprint nodes compared, but the performance information, e.g., accuracy, may be compared to ensure that the performance of the GNN-FP computer model 452 is comparable between processing the graph data structure 410 and the new input graph data structure 490. That is, if the GNN-FP computer model 452 predicts the same classification of a fingerprint node between graph data structures 410 and 490, but the performance information is more than a predetermined threshold amount different from one another, then it can be determined that the graph data structure 490 may be compromised and is invalid. Thus, a matching inference may be determined to be an inference that generates a same classification by the GNN based on the new graph data structure 490, as the classification generated by the GNN based on the original graph data structure 410, and in some illustrative embodiments, also requiring that the performance information, e.g., accuracy or confidence value, be within a predetermined threshold amount of the performance generated by the GNN based on the original graph data structure 410. The performance comparator 474 may generate a statistical measure of the matches and non-matches of performance of the GNN between the original graph data structure 410 and the new graph data structure 490 and may compare this statistical measure to a predetermined threshold to determine whether the new graph data structure 490 represents a potentially compromised version of the original graph data structure 410, e.g., a ratio of matched to non-matched inferences being equal to or above a predetermined threshold or not.

It should be appreciated that these classifications and performance information, or metrics, may be the basis for application of a hash function similar to what was described previously, such that they generate a hash value for the fingerprint nodes. In such a case, the evaluation by the graph adversarial attack detection engine 470 may again comprise a comparison of hash values to determine if they match. If there is a significant difference in classifications or performance information, then the hash values will not match and thus, the graph data structure 490 will be determined to be invalid or potentially compromised.

Thus, if the structure of the graph has been modified, as determined from the graph structure comparator 472, or the performance of the GNN is significantly altered as a result of the new graph data structure 490, as determined from the performance comparator 474, then the new graph data structure 490 may be considered to be potentially compromised; otherwise, the new graph data structure 490 may be considered valid and not compromised. A corresponding output 480 may then be output to downstream computing systems/processes 485 for further operations, such as a GNN generating a prediction/classification based on the new graph data structure 490.

It should be appreciated that the use of a hash function, or other similar type of encoding, is not required for the GNN performance based fingerprint based mechanisms. Instead, a direct comparison of classifications and performance information for fingerprint nodes may be used. That is, if one or more classifications of fingerprint nodes do not match, or if one or more performance metrics associated with these classifications are different by a threshold amount or more, then the graph data structure 490 may be considered invalid or potentially compromised; otherwise, the graph data structure 490 may be considered valid or uncompromised and able to be relied upon or otherwise the basis of further downstream processing. For example, if the graph data structure 490 is considered valid, then the results generated by the GNN 485 may be validated and relied upon.

It should further be appreciated that while the illustrative embodiments are described with regard to the graph fingerprint generator 430 generating both a structural fingerprint and a GNN performance-based fingerprint for an input graph data structure 410/490, the illustrative embodiments are not limited to requiring both fingerprint data structures. To the contrary, in some illustrative embodiments, one or the other of the graph structure fingerprint or performance-based fingerprint may be utilized to verify the integrity of the input graph data structure 490. In addition, other graph fingerprinting mechanisms which may become apparent to those of ordinary skill in the art in view of the present description may be utilized without departing from the spirit and scope of the illustrative embodiments.

Thus, based on the above description, it can be seen that the process of graph fingerprint based security according to at least one illustrative embodiment comprises generating, by the graph fingerprint generator 430, for a first graph data structure, such as graph data structure 410, a first fingerprint data structure based on features extracted from the first graph data structure. This first fingerprint data structure may be either a graph structure based fingerprint data structure or a GNN performance based fingerprint data structure, for example. The process further comprises receiving a second graph data structure, such as graph data structure 490, and generating, by a second graph fingerprint engine, which may be the same fingerprint engine that generated the first fingerprint data structure, a second graph fingerprint data structure based on features extracted from the second graph data structure. Moreover, the process comprises comparing, by an adversarial attack detection engine 470, the first fingerprint data structure to the second fingerprint data structure to determine whether the first fingerprint data structure matches the second fingerprint data structure. In addition, the process comprises in response to the first fingerprint data structure not matching the second fingerprint data structure, outputting, by the adversarial attack detection engine 470, an output 480 indicating that the second data structure corresponds to an adversarial attack.

In some illustrative embodiments, the second graph data structure 490 is the same graph data structure as the first graph data structure 410 in response to the second graph data structure not having perturbation differences from the first graph data structure 410, and the second graph data structure 490 is different from the first graph data structure 410 in response to adversarial perturbations being introduced into the first graph data structure 410. In some illustrative embodiments, the first fingerprint engine, e.g., 440 or 450, executes on a first graph data structure owner computing system, and the second fingerprint engine executes on a remote computing system from the first graph data structure owner computing system.

That is, in FIG. 4, while only one instance of the graph structure based fingerprint engine 440 and the GNN performance based fingerprint engine 450 are shown as being part of the GFAD engine 400, which may be implemented, for example, on one or more server computing systems, such as a cloud service of a cloud computing environment, an instance of one or both of these fingerprint engines 440/450 may be implemented on a client computing device (not shown) for generating the original baseline fingerprint data structures based on original graph data structures 410. That is, at the client computing device's secure location, the original fingerprint data structures may be generated and maintained in a fingerprint store, e.g., fingerprint store 460 may be local to the client computing device. Thus, the client computing device only sends the fingerprint data structure, potentially encrypted or otherwise secured through a known security mechanism, to the GFAD engine 400 for verification of an input graph data structure 490, and does not send the original graph data structure 410. In such an implementation the GFAD engine 400 may operate the elements 420-450 and 470 as noted above to compare a fingerprint data structure generated by the server/cloud based GFAD engine 400 to the fingerprint data structure provided by the client computing device. The GFAD engine 400 may then return an output 480 indicating whether or not the input graph data structure 490 is valid/invalid, i.e., not compromised/compromised. If the fingerprints are determined to be a match, then further processing of the graph data structure 490 may be permitted, e.g., the GNN 485 may be implemented on the server(s) or cloud computing system, or may be local to the client computing system.

In some illustrative embodiments, generating the first fingerprint data structure comprises extracting first structure features of nodes and edges of the first graph data structure 410, and inputting the extracted first structure features into a hashing function to generate the first fingerprint data structure which comprises a first hash value corresponding to the first extracted structure features. In still some illustrative embodiments, generating the second fingerprint data structure comprises extracting second structure features of nodes and edges of the second graph data structure 490, and inputting the extracted second structure features into the hashing function to generate the second fingerprint data structure which comprises a second hash value corresponding to the extracted second structure features. In some illustrative embodiments, comparing the first fingerprint data structure and second fingerprint data structure comprises comparing the first hash value to the second hash value to determine whether the first hash value matches the second hash value.

In some illustrative embodiments, a graph neural network (GNN) model, e.g., GNN-FP computer model 452, is trained, using a machine learning training operation, based on input features of graph data structures, to generate fingerprints of the graph data structures. In some illustrative embodiments, generating the first fingerprint data structure comprises extracting first features of nodes, e.g., fingerprint nodes, of the first graph data structure 410, and inputting the extracted first structure features into the trained GNN-FP 452 to generate the first fingerprint data structure which comprises performance information of the trained GNN-FP 452 for the generation of the first fingerprint data structure. In still some illustrative embodiments, generating the second fingerprint data structure comprises extracting second features of nodes of the second graph data structure 490, and inputting the extracted second structure features into the trained GNN-FP 452 to generate the second fingerprint data structure which comprises performance information of the trained GNN-FP 452 for the generation of the second fingerprint data structure. In some illustrative embodiments, comparing the first fingerprint data structure and second fingerprint data structure comprises comparing the first performance information with the second performance information to determine whether the first performance information matches the second performance information.

Thus, with the mechanisms of the illustrative embodiments, the integrity of graph data structures, which are the basis of performing AI computer model functions, may be verified based on a fingerprint comparison of the graph data structures to original graph data structures. In this way, downstream computing systems, computing system processes, and users may have greater trust that the graph data structures that they are operating on have not been compromised by adversarial attacks and introduction of perturbations into the graph data structure to cause the AI computer model to generate incorrect results.

Figure 5:
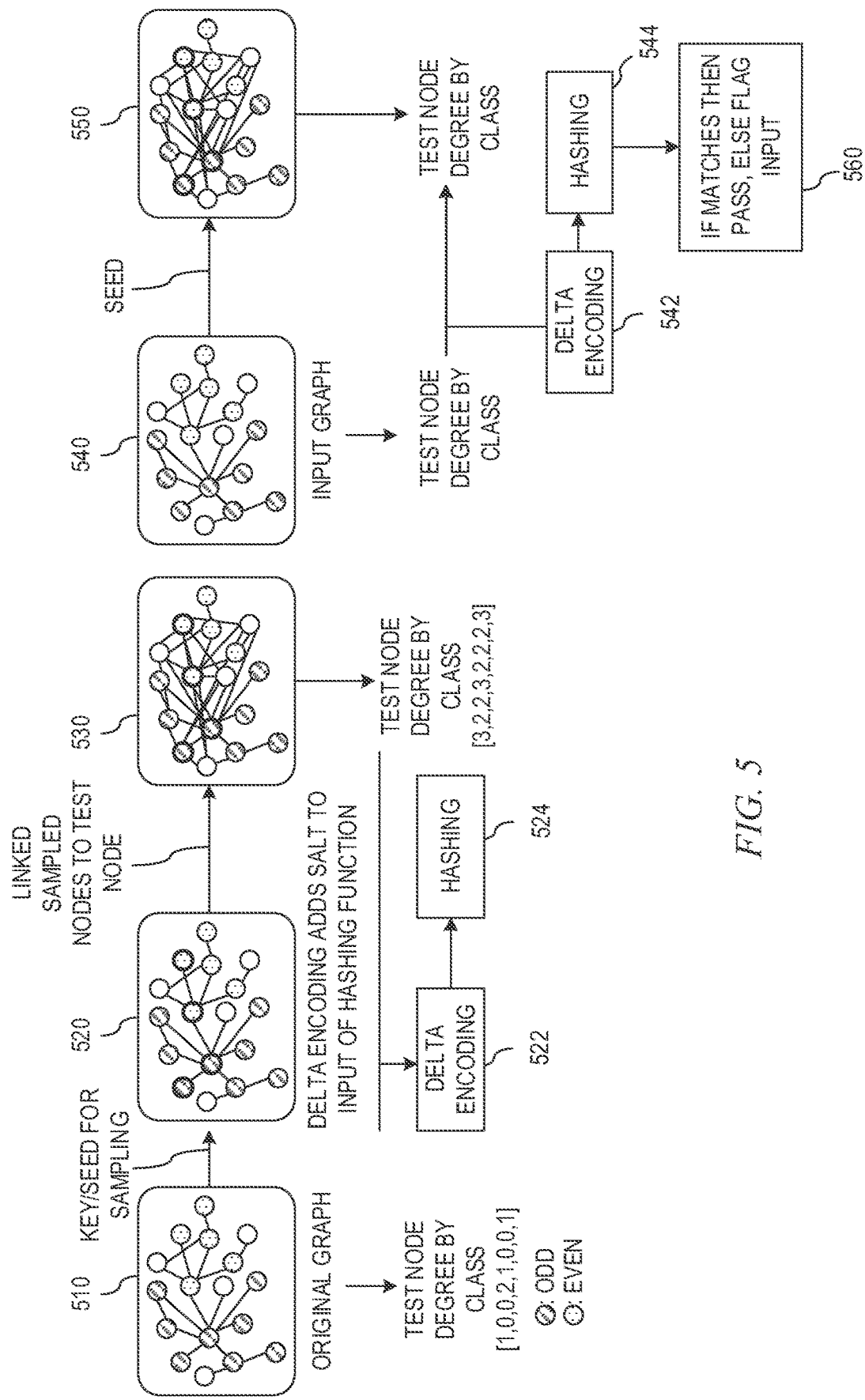
FIG. 5 is an example diagram illustrating a process for generating a structural feature based fingerprint and performing verification of a graph data structure based on the structural feature based fingerprint in accordance with one illustrative embodiment.
Figure 6:
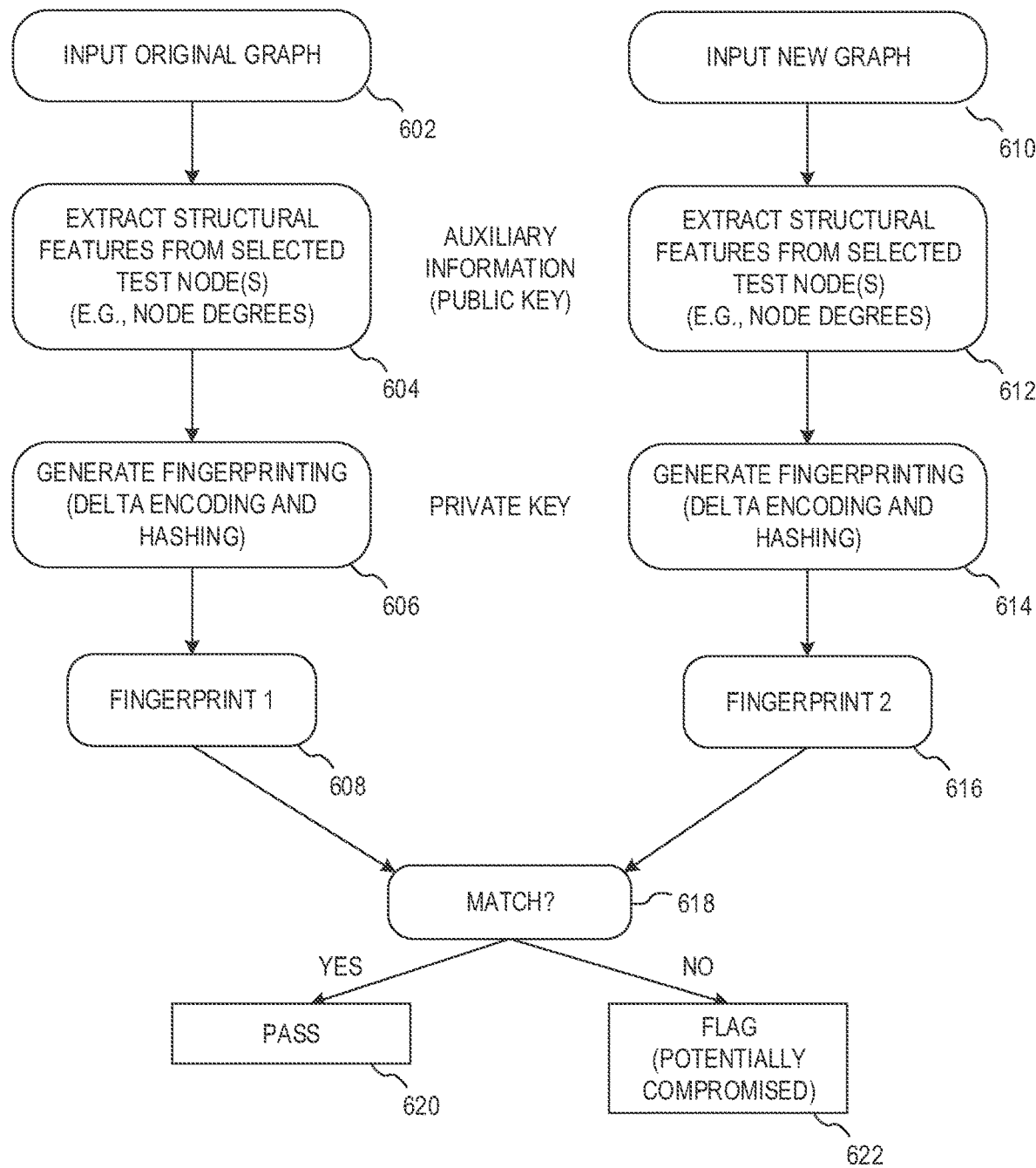
FIG. 6 is a flowchart outlining an example process for generating a structural feature based fingerprint and performing verification of a graph data structure based on the structural feature based fingerprint in accordance with one illustrative embodiment.
Figure 7:
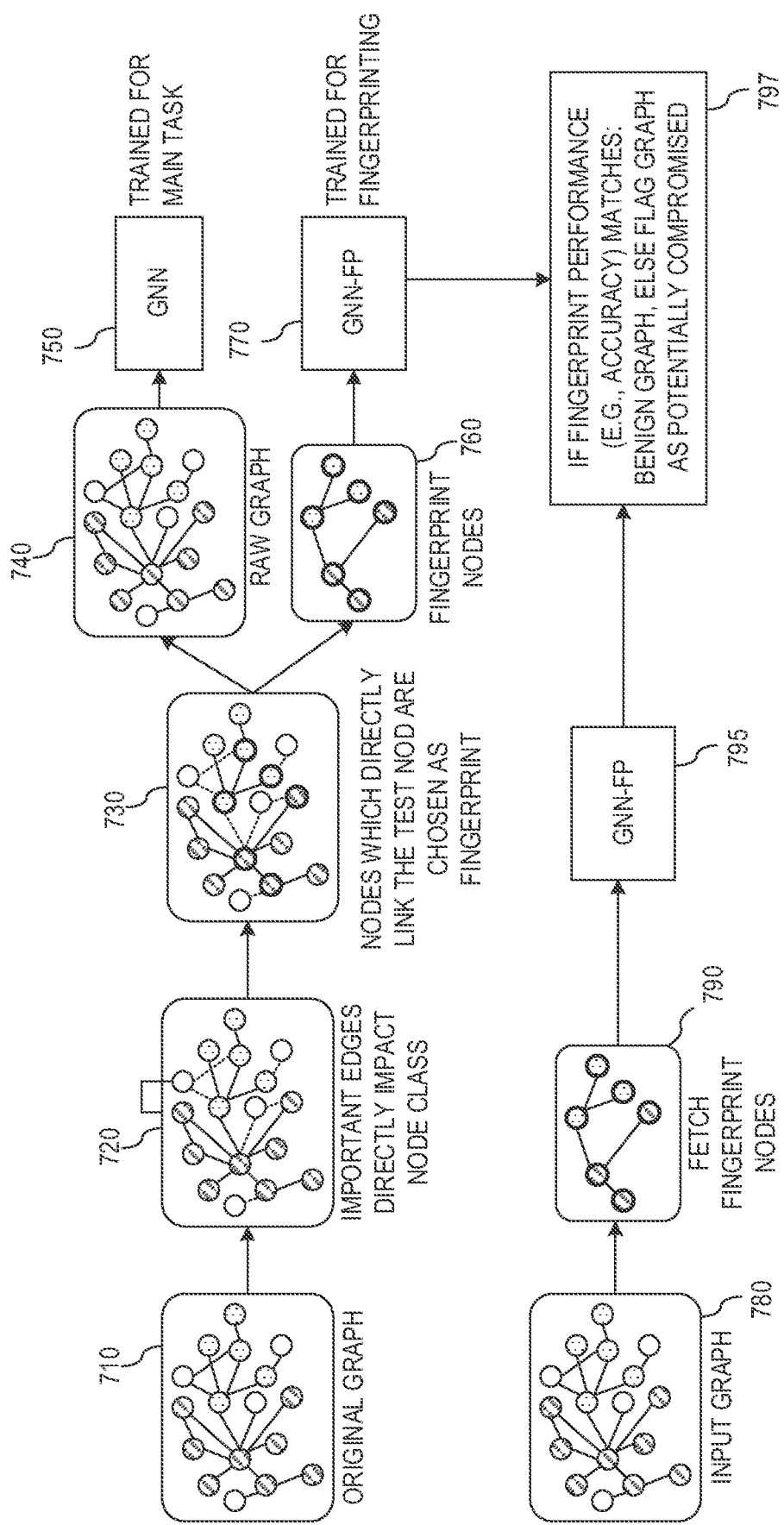
FIG. 7 is an example diagram illustrating a process for generating a graph neural network (GNN) performance based fingerprint and performing verification of a graph data structure based on the GNN performance based fingerprint in accordance with one illustrative embodiment.
Figure 8:
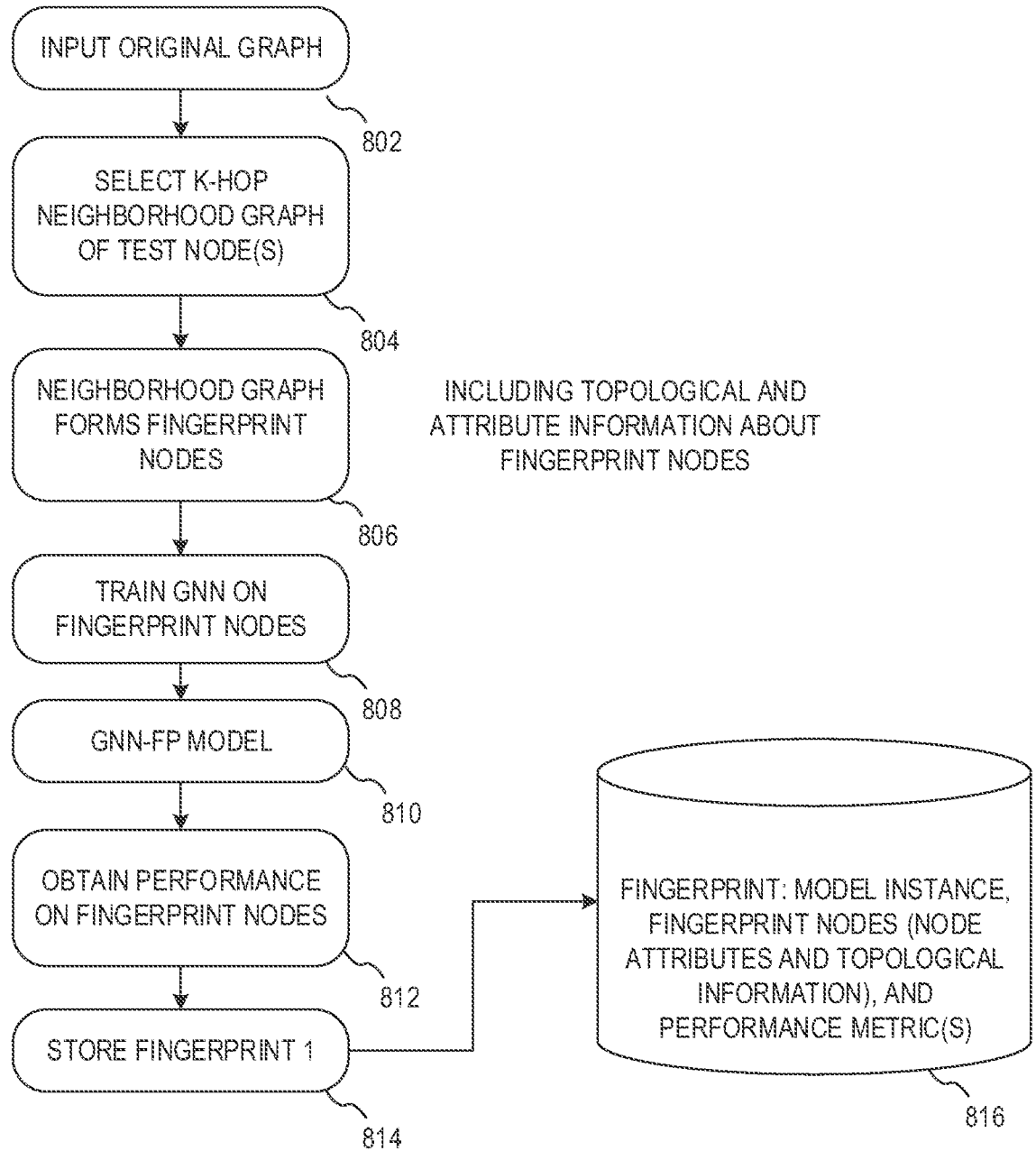
FIG. 8 is a flowchart outlining an example process for generating a GNN performance based fingerprint in accordance with one illustrative embodiment.
Figure 9:
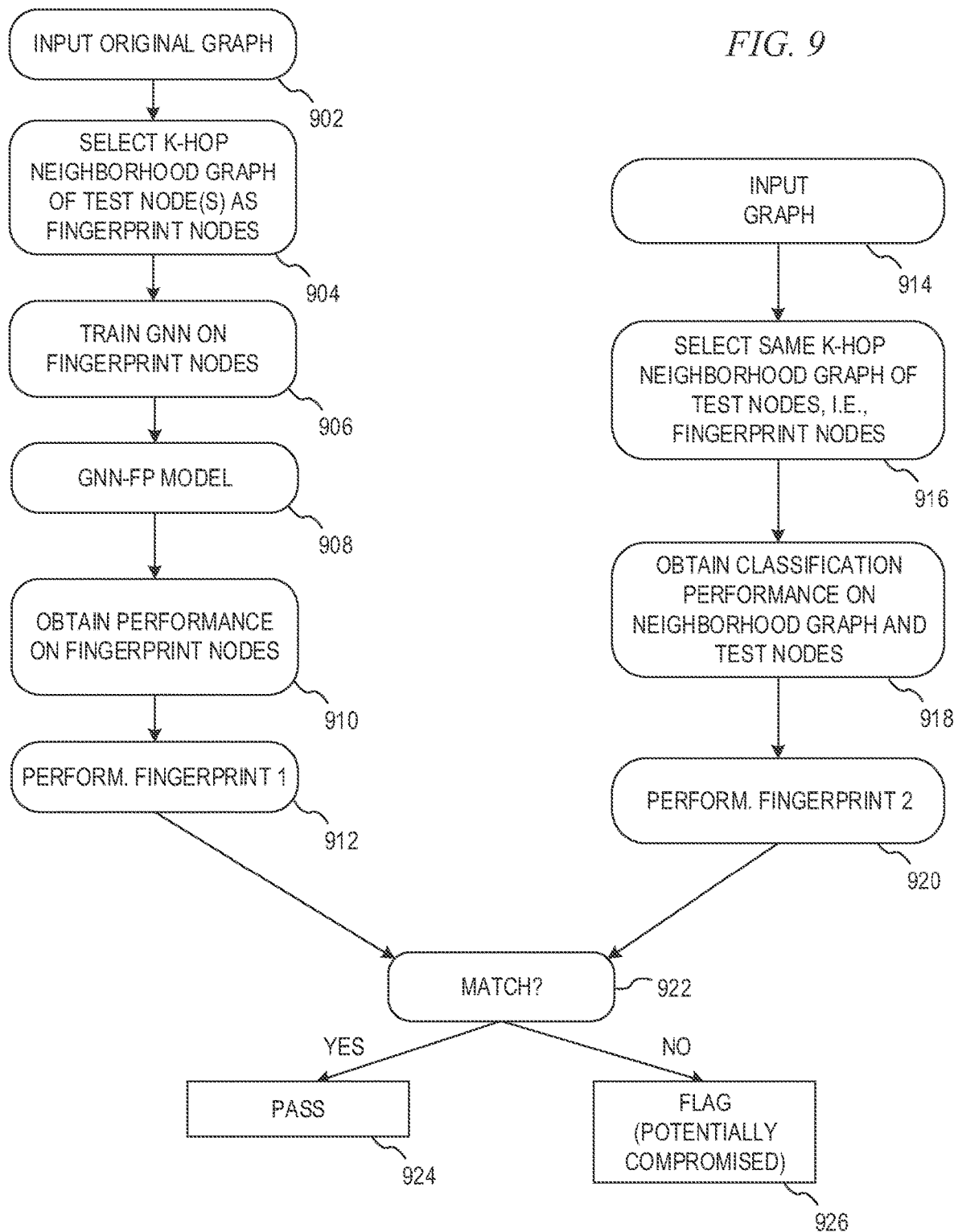
FIG. 9 is a flowchart outlining an example process for verifying a graph data structure based on a GNN performance based fingerprint in accordance with one illustrative embodiment.

As described above, the illustrative embodiments may employ either or both of graph structural feature based fingerprinting and GNN performance based fingerprinting to implement the security mechanisms of the illustrative embodiments that ensure the integrity of input graph data structures. FIG. 5 is an example diagram illustrating a process for generating a structural feature based fingerprint and performing verification of a graph data structure based on the structural feature based fingerprint in accordance with one illustrative embodiment. The operation shown in FIG. 5 may be implemented, for example, in the logic of the graph structure comparator 472 in FIG. 4. FIG. 6 is a flowchart outlining this example process of FIG. 5. FIG. 7 is an example diagram illustrating a process for generating a GNN performance based fingerprint and performing verification of a graph data structure based on the GNN performance based fingerprint in accordance with one illustrative embodiment. The operation shown in FIG. 7 may be implemented, for example, in the logic of the performance comparator 474 of FIG. 4. FIGS. 8 and 9 are flowcharts outlining this example process of FIG. 7.

FIGS. 6, 8, and 9 present flowcharts outlining example operations of elements of the present invention with regard to one or more illustrative embodiments. It should be appreciated that the operations outlined in FIGS. 6, 8, and 9 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIGS. 6, 8, and 9, and may, in some cases, make use of the results generated as a consequence of the operations set forth in FIGS. 6, 8, and 9, the operations in FIGS. 6, 8, and 9 themselves are specifically performed by the improved computing tool in an automated manner.

With reference now to FIG. 5, this figure shows an example diagram illustrating a process for generating a structural feature based fingerprint and performing verification of a graph data structure based on the structural feature based fingerprint in accordance with one illustrative embodiment. As shown in FIG. 5, an original input graph data structure 510 is processed to generate vector representations, or embeddings, of features for each of the nodes of the graph data structure 510. In this example case, the vector representation is a vector of node degrees by class, where the vector is in nodal order according to the graph data structure based on the dependencies in the graph data structure 510. The node degrees by class value is determined using domain knowledge of the graph and is application specific. The attribute "node class" is subjective to the application domain and a node can have multimer classes with outbound edges of the node being grouped by class (again, this is subject to the application domain of the graph).

After generating the vector representations or embeddings of the original input graph data structure 510, in a second stage 520, the nodes of the graph data structure are sampled vector representations may be further processed to add salt, or random noise, such as through a delta encoding 522. The resulting values are then hashed using a hashing function 524 to generate a hash value for the sampled nodes. The vector of values shown in stage 510 is an embodiment based on the class definition of the node in some application domain. This is representing uncompromised (known good graph data state) vector values. The vector shown in stage 530 represents a possibly compromised graph data state, where the vectors could be different assuming the application domain has not changed (i.e., it is constant as the mechanisms are looking for adversarial changes to the graph, not application changes). If there is an application change, then the baseline fingerprint must be updated.

During a runtime operation, a new input graph 540 is received and a similar process is followed to sample the input graph 540, perform delta encoding 542, and generate a hash value 544. In stage 550, the resulting hash is compared to the original hash generated from 524 and if there is a match, then the verification of the graph data structure 540 generates an output 560 that indicates that it is valid. Otherwise, the graph data structure 540 may be flagged as potentially compromised and invalid in the output 560.

FIG. 6 is a flowchart outlining an example process for generating a structural feature based fingerprint and performing verification of a graph data structure based on the structural feature based fingerprint in accordance with one illustrative embodiment. The process shown in FIG. 6 has two branches with the left side branch (steps 602-608) corresponding to an offline phase of operation in which an original input graph data structure is processed to generate a corresponding original, or baseline, fingerprint data structure. The right side branch (steps 610-616) corresponds to an online phase of operation in which a new input graph data structure is received and is to be verified based on the generated original, or baseline, fingerprint data structure. It should be appreciated that these branches may be executed at different times, e.g., offline phase and online phases of operation, or in some cases, both branches may be executed substantially simultaneously during an online phase of operation.

As shown in FIG. 6, following the left side branch, an original input graph is received (step 602) and structural features, e.g., node degrees or the like, are extracted from selected test nodes (sampled nodes) (step 604). A fingerprint data structure is generated based on these structural features, e.g., by implementing a delta-coding and hashing function on the resulting salted feature values (step 606). In some illustrative embodiments, the extracted structural features may be salted by salt value to introduce a measure or randomness for more secure fingerprint generation. This results in the original, or baseline fingerprint (fingerprint1) which may be stored in a fingerprint store for verification of other input graph data structures that purport to be the original input graph data structure from step 602 (step 608). In cases where salt is added to the extracted features, the salt value(s) may be stored in association with the fingerprints in the fingerprint store for later retrieval and application to new extracted features so that comparisons may be performed. It should be appreciated that the operations in steps 602-608 may be performed on a client computing device, server computing device, cloud computing system, or the like. Thus, in some illustrative embodiments, these operations 602-608 may be performed in a secured computing system of a client computing device so that the original graph data structure need not be transmitted, and potentially exposed outside of a trusted environment. Only the fingerprint (fingerprint1) need be transmitted for verification of the input graph data structure of step 610.

A new input graph data structure is received (step 610) and structural features, e.g., node degrees, of test nodes are extracted (step 612). The extracted features are then used to generate a second fingerprint data structure, such as by performing again delta coding and hashing (step 614). This results in a second fingerprint (fingerprint2) (step 616). The second fingerprint is compared to the first fingerprint (step 618) to determine if the fingerprints match. If there is a match, then the verification of the integrity of the input graph data structure 610 results in a pass (step 620). Otherwise, if the fingerprints do not match, then the input graph data structure from step 610 may be flagged as potentially compromised and invalid (step 622). The operation then terminates.

FIG. 7 is an example diagram illustrating a process for generating a graph neural network (GNN) performance based fingerprint and performing verification of a graph data structure based on the GNN performance based fingerprint in accordance with one illustrative embodiment. As shown in FIG. 7, during an offline phase of operation in which an original or baseline fingerprint is to be generated for an original graph data structure 710, a test node is selected from the original graph data structure 710 and the linked nodes that directly affect the test node are identified via the edge connections (720-730). These selected nodes are the fingerprint nodes for the graph data structure 710. The graph data structure 710 may then be provided as the raw graph 740 to the main GNN 750 to perform its trained main task, e.g., a prediction/classification. At substantially a same time, the fingerprint nodes 760 are input to the GNN-FP computer model 770 for generating a GNN performance based fingerprint, which may be stored for performing graph data structure integrity verification. It should be appreciated that this fingerprint data structure comprises the performance information for the GNN-FP computer model 770 in generating the fingerprint, e.g., accuracy or confidence of node classifications, and may also include the actual classification information for the various fingerprint nodes.

During an online phase of operation, when verification of a new input graph data structure 780 is to be performed, a selection of fingerprint nodes 790, similar to that of the offline phase of operation, is performed. The fingerprint nodes 790 are input to the GNN-FP computer model 795, which is the same GNN-FP model as GNN-FP model 770 but operating on the fingerprint nodes 790 of the new input graph 780. The GNN-FP model 770 generates a second fingerprint data structure when is then compared to the first fingerprint data structure to determine if there is a match. In this case, the match may be more of a fuzzy match in that a threshold tolerance amount may be predetermined by which the performance information may vary and yet still be considered to be valid and not compromised. If the two fingerprint data structures match, given this predetermined tolerance threshold, then the output 797 indicates the graph data structure 780 to be valid and not compromised. If the two fingerprints do not match within the given tolerance, then the output 797 may flag the input graph data structure 780 as potentially compromised and invalid.

FIG. 8 is a flowchart outlining an example process for generating a GNN performance based fingerprint in accordance with one illustrative embodiment. As shown in FIG. 8, the operation starts by receiving an input original graph data structure (step 802). The k-hop neighborhood graph of at least one test node is selected, where k is any suitable integer value for the specific implementation (step 804). The k-hop neighborhood graph is used to form the fingerprint node data structure, which may include the topological and attribute information about the fingerprint nodes (step 806). A GNN is executed, or trained, on the fingerprint nodes (step 808) to generate a GNN-FP computer model (step 810). As described earlier, in accordance with some illustrative embodiments, the fingerprint includes a trained GNN using a set of features over a set of target/candidate nodes, i.e., the paths and/or subgraphs used to generate the set of features, and inferences made based on the set of features of the target/candidate nodes used to perform the GNN training. With a potentially compromised graph, if the first test passes indicating that topological structure of the graph is intact, then the second GNN inference test is done by collecting similar features from the potentially compromised graph and running inferences using the trained GNN. The performance metrics are compared, and a threshold based decision is made.

Thus, the GNN-FP computer model generates a classification performance for the classification of the fingerprint nodes (step 812) which is stored as part of the fingerprint data structure (step 814). For example, the fingerprint data structure may include a GNN-FP model instance identifier, an identifier of the fingerprint nodes as well as their node attributes and topological information, and the performance metric information (step 816). In cases where salt is added to the extracted features to generate a level of randomness to the fingerprint, the salt value(s) may be stored in association with the fingerprints for use in generating hashes for comparison, such that the salt value may be retrieved and applied. The operation then terminates.

FIG. 9 is a flowchart outlining an example process for verifying a graph data structure based on a GNN performance based fingerprint in accordance with one illustrative embodiment. FIG. 9, similar to FIG. 6, has left and right side operations which are performed on an original input graph data structure and a new input graph data structure, respectively. As shown in FIG. 9, the left hand side operations (steps 902-912) mirror the operation outlined previously in FIG. 8. The right hand side operations involve the receiving of a new input graph data structure (step 914) and the execution of the GNN-FP model (see 908) on the k-hop neighborhood of the at least one test node selected from the input graph data structure from step 914 (step 916). This generates classification performance information for the GNN-FP model executing on the input graph data structure from step 914 (step 918). The resulting fingerprint data (step 920) may be compared to the fingerprint data of the original input graph (step 912) to determine if there is a match within a given tolerance (step 922). If there is a match, then the verification of the integrity of the input graph data structure from step 914 passes (step 924); otherwise, the input graph data structure may be flagged as potentially compromised or invalid (step 926). The operation then terminates.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for detecting adversarial attacks on graph data structures, the method comprising:

generating, by a first graph fingerprint engine, for a first graph data structure, a first fingerprint data structure based on features extracted from the first graph data structure;

receiving a second graph data structure;

generating, by a second graph fingerprint engine, a second graph fingerprint data structure-based on features extracted from the second graph data structure;

comparing, by an adversarial attack detection engine, the first fingerprint data structure to the second fingerprint data structure to determine whether the first fingerprint data structure matches the second fingerprint data structure; and in response to the first fingerprint data structure not matching the second fingerprint data structure, outputting, by the adversarial attack detection engine, an output indicating that the second data structure corresponds to an adversarial attack, wherein the second graph data structure is the same graph data structure as the first graph data structure in response to the second graph data structure not having perturbation differences from the first graph data structure, and wherein the second graph data structure is different from the first graph data structure in response to adversarial perturbations being introduced into the first graph data structure.

2. The method of claim 1, wherein the first fingerprint engine executes on a first graph data structure owner computing system, and the second fingerprint engine executes on a remote computing system from the first graph data structure owner computing system.

3. The method of claim 1, wherein generating the first fingerprint data structure comprises:
  extracting first structure features of nodes and edges of the first graph data structure; and
  inputting the extracted first structure features into a hashing function to generate the first fingerprint data structure which comprises a first hash value corresponding to the first extracted structure features.

4. The method of claim 3, wherein generating the second fingerprint data structure comprises:
  extracting second structure features of nodes and edges of the second graph data structure; and
  inputting the extracted second structure features into the hashing function to generate the second fingerprint data structure which comprises a second hash value corresponding to the extracted second structure features, and wherein comparing the first fingerprint data structure and second fingerprint data structure comprises comparing the first hash value to the second hash value to determine whether the first hash value matches the second hash value.

5. The method of claim 1, further comprising training a graph neural network (GNN) model, using a machine learning training operation, based on input features of graph data structures, to generate fingerprints of the graph data structures.

6. The method of claim 5, wherein generating the first fingerprint data structure comprises:
  extracting first features of nodes of the first graph data structure; and
  inputting the extracted first structure features into the trained GNN to generate the first fingerprint data structure which comprises performance information of the trained GNN for the generation of the first fingerprint data structure.

7. The method of claim 6, wherein generating the second fingerprint data structure comprises:
  extracting second features of nodes of the second graph data structure; and
  inputting the extracted second structure features into the trained GNN to generate the second fingerprint data structure which comprises performance information of the trained GNN for the generation of the second fingerprint data structure, and wherein comparing the first fingerprint data structure and second fingerprint data structure comprises comparing the first performance information with the second performance information to determine whether the first performance information matches the second performance information.

8. A computer program product comprising a computer readable storage medium having a computer readable program stored therein, wherein the computer readable program, when executed on a data processing system, causes the data processing system to:
  generate, by a first graph fingerprint engine, for a first graph data structure, a first fingerprint data structure-based on features extracted from the first graph data structure;
  receive a second graph data structure;
  generate, by a second graph fingerprint engine, a second graph fingerprint data structure-based on features extracted from the second graph data structure;
  compare, by an adversarial attack detection engine, the first fingerprint data structure to the second fingerprint data structure to determine whether the first fingerprint data structure matches the second fingerprint data structure; and
  in response to the first fingerprint data structure not matching the second fingerprint data structure, output, by the adversarial attack detection engine, an output indicating that the second data structure corresponds to an adversarial attack,
  wherein the second graph data structure is the same graph data structure as the first graph data structure in response to the second graph data structure not having perturbation differences from the first graph data structure, and wherein the second graph data structure is different from the first graph data structure in response to adversarial perturbations being introduced into the first graph data structure.

9. The computer program product of claim 8, wherein the first fingerprint engine executes on a first graph data structure owner computing system, and the second fingerprint engine executes on a remote computing system from the first graph data structure owner computing system.

10. The computer program product of claim 8, wherein generating the first fingerprint data structure comprises:
  extracting first structure features of nodes and edges of the first graph data structure; and
  inputting the extracted first structure features into a hashing function to generate the first fingerprint data structure which comprises a first hash value corresponding to the first extracted structure features.

11. The computer program product of claim 10, wherein generating the second fingerprint data structure comprises:
  extracting second structure features of nodes and edges of the second graph data structure; and
  inputting the extracted second structure features into the hashing function to generate the second fingerprint data structure which comprises a second hash value corresponding to the extracted second structure features, and wherein comparing the first fingerprint data structure and second fingerprint data structure comprises comparing the first hash value to the second hash value to determine whether the first hash value matches the second hash value.

12. The computer program product of claim 8, further comprising training a graph neural network (GNN) model, using a machine learning training operation, based on input features of graph data structures, to generate fingerprints of the graph data structures.

13. The computer program product of claim 12, wherein generating the first fingerprint data structure comprises:
  extracting first features of nodes of the first graph data structure; and
  inputting the extracted first structure features into the trained GNN to generate the first fingerprint data structure which comprises performance information of the trained GNN for the generation of the first fingerprint data structure.

14. The computer program product of claim 13, wherein generating the second fingerprint data structure comprises:
extracting second features of nodes of the second graph data structure; and
inputting the extracted second structure features into the trained GNN to generate the second fingerprint data structure which comprises performance information of the trained GNN for the generation of the second fingerprint data structure, and wherein comparing the first fingerprint data structure and second fingerprint data structure comprises comparing the first performance information with the second performance information to determine whether the first performance information matches the second performance information.

15. An apparatus comprising:
at least one processor; and
at least one memory coupled to the at least one processor, wherein the at least one memory comprises instructions which, when executed by the at least one processor, cause the at least one processor to:
generate, by a first graph fingerprint engine, for a first graph data structure, a first fingerprint data structure based on features extracted from the first graph data structure;
receive a second graph data structure;
generate, by a second graph fingerprint engine, a second graph fingerprint data structure-based on features extracted from the second graph data structure;
compare, by an adversarial attack detection engine, the first fingerprint data structure to the second fingerprint data structure to determine whether the first fingerprint data structure matches the second fingerprint data structure; and
in response to the first fingerprint data structure not matching the second fingerprint data structure, output, by the adversarial attack detection engine, an output indicating that the second data structure corresponds to an adversarial attack,
wherein the second graph data structure is the same graph data structure as the first graph data structure in response to the second graph data structure not having perturbation differences from the first graph data structure, and wherein the second graph data structure is different from the first graph data structure in response to adversarial perturbations being introduced into the first graph data structure.

16. The apparatus of claim 15, wherein the first fingerprint engine executes on a first graph data structure owner computing system, and the second fingerprint engine executes on a remote computing system from the first graph data structure owner computing system.

17. The apparatus of claim 15, wherein generating the first fingerprint data structure comprises:
extracting first structure features of nodes and edges of the first graph data structure; and
inputting the extracted first structure features into a hashing function to generate the first fingerprint data structure which comprises a first hash value corresponding to the first extracted structure features.

* * * * *